(12) United States Patent
Rising, III

(10) Patent No.: US 7,542,606 B2
(45) Date of Patent: Jun. 2, 2009

(54) USE OF HAUSDORFF DISTANCES IN THE EARTH MOVER LINEAR PROGRAM

(75) Inventor: Hawley K. Rising, III, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 726 days.

(21) Appl. No.: 11/154,049

(22) Filed: Jun. 15, 2005

(65) Prior Publication Data

US 2006/0023947 A1    Feb. 2, 2006

Related U.S. Application Data

(60) Provisional application No. 60/592,864, filed on Jul. 29, 2004.

(51) Int. Cl.
*G06K 9/00* (2006.01)
(52) U.S. Cl. .................... 382/181; 382/217; 382/228
(58) Field of Classification Search ............... 382/181, 382/217, 228
See application file for complete search history.

(56) References Cited

U.S. PATENT DOCUMENTS

2006/0165277 A1*   7/2006   Shan et al. .................. 382/159

OTHER PUBLICATIONS

Peleg et al., "A Unified Approach to the Change of Resolution" Space and Gray-Level, 1989, IEEE Transactions on Pattern Analysis and Machine Intelligence, vol. 11. No. 7. pp. 739-742.*
Deng, Content-based Comparison of Image Collections via Distance Measuring of Self-organised Maps, 2004, IEEE Proceedings of the 10th International Multimedia Modelling Conference.*

* cited by examiner

*Primary Examiner*—John B Strege
(74) *Attorney, Agent, or Firm*—Blakely, Sokoloff, Taylor & Zafman LLP

(57) ABSTRACT

A method and apparatus for comparing data is described. In one embodiment, an exemplary method includes receiving a first set of data pertaining a first object and a second set of data pertaining to a second object, and comparing the first object with the second object using an earth mover's distance method that is based on computation of a series of Hausdorff distances.

19 Claims, 7 Drawing Sheets

|     | x1   | x2   | y1   | y2   | y3   | RHS   |
| --- | ---- | ---- | ---- | ---- | ---- | ----- |
|     | 1    | 0    | 1    | 0    | 0    | 155.7 |
|     | 1    | 0    | 0    | 1    | 0    | 277   |
|     | 1    | 0    | 0    | 0    | 1    | 252.3 |
|     | 0    | 1    | 1    | 0    | 0    | 292.9 |
|     | 0    | 1    | 0    | 1    | 0    | 316.3 |
|     | 0    | 1    | 0    | 0    | 1    | 198.2 |
|     | -.74 | -.26 | -.23 | -.26 | -.51 | 0     |

USE OF HAUSDORFF DISTANCES IN THE EARTH MOVER LINEAR PROGRAM

RELATED APPLICATIONS

This application is related to and claims the benefit of U.S. Provisional Patent application Ser. No. 60/592,864 filed Jul. 29, 2004, which is hereby incorporated by reference.

FIELD OF THE INVENTION

This invention relates generally to data comparison, and more particularly to comparing data using the Earth Mover's Distance linear program.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Sony Electronics, Inc., All Rights Reserved.

BACKGROUND OF THE INVENTION

In comparing video data and other multimedia data, one cannot expect to find exactly identical data. Therefore, comparison of multimedia data typically uses similarity-based techniques that often measure the similarity of the contents numerically. One of such measurements is known as the earth mover's distance (EMD). The EMD may be used to match images in image retrieval applications. These images may be quite different even if they are views of the same scene because of illumination changes, viewpoint motion, occlusions, etc.

Different features of an image are typically described using various distributions. For example, the texture content of an image can be described by distribution of local energy over frequency. The overall brightness content of a gray-scale image may be described by a one-dimensional distribution of image intensities, and a three-dimensional distribution can play a similar role for color images. The EMD is based on the minimal cost that must be paid to transform one distribution into the other. Given two distributions, one can be seen as a mass of earth property spread in space, and the other as a collection of holes in this space. The EMD measures the least amount of work needed to fill the holes with earth. The EMD is described in more detail in a publication by Y. Rubner, C. Tomasi, and L. Guibas, "The Earth Mover's Distance as a Metric for Image Retrieval," Technical Report STAN-CS-TN-98-86, Computer Science Department, Stanford University, September 1998.

SUMMARY OF THE INVENTION

A method and apparatus for comparing data is described. According to one aspect, an exemplary method includes receiving a first set of data pertaining a first object and a second set of data pertaining to a second object, and comparing the first object with the second object using an earth mover's distance method that is based on computation of a series of Hausdorff distances.

BRIEF DESCRIPTION OF THE DRAWINGS

FIG. 5 illustrates an exemplary matrix.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
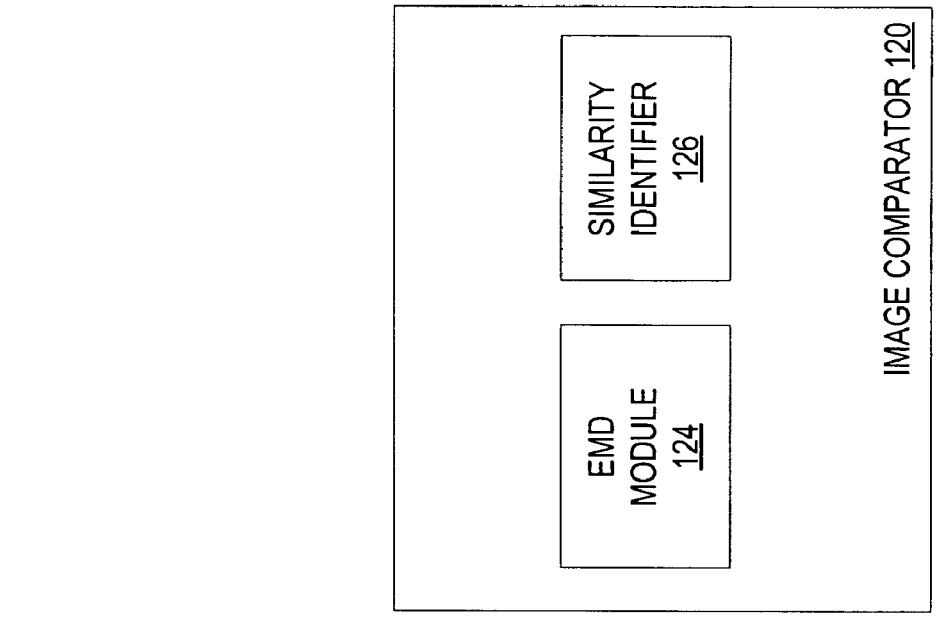
FIG. 1 illustrates one embodiment of an image comparison system.
Figure 1:
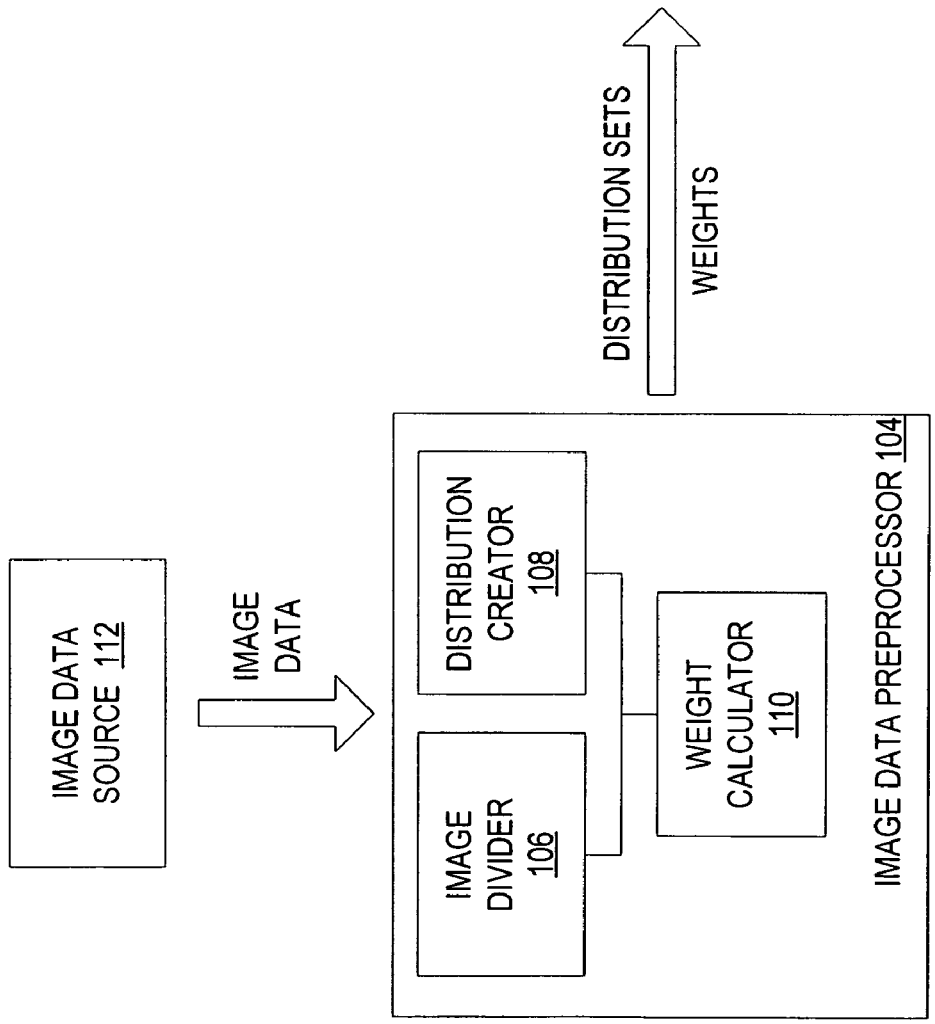

Beginning with an overview of the operation of the invention, FIG. 1 illustrates one embodiment of an image comparison system 100. The image comparison system 100 may be used to compare images for various applications. These applications may include, for example, content-based image retrieval (e.g., to search for images having similar color characteristics, similar features, etc.), robotics operations (e.g., to enable a robot building a product on assembly line to compare a stored image of the product with an image of the constructed product), medical image analysis (e.g., to determine that a tissue detected in a medical image is normal rather than cancerous), etc.

The system 100 includes an image data source 102, an image data preprocessor 104 and an image comparator 120. The image data source 102 provides images to be compared to the image data preprocessor 104. The image source data 102 may be one or more video cameras, a database storing various images, etc.

The image data preprocessor 104 prepares received images for comparison. In one embodiment, the image data preprocessor 104 includes an image divider 106, a distribution creator 108 and a weight calculator 110. The image divider 106 is responsible for partitioning each image into blocks or segments according to a size specified by a user or a size configured based on a specific application.

The distribution creator 108 is responsible for creating a set of distributions for each image. A set of distributions describes a certain image characteristic for each block or segment of the image. For example, the set of distributions may include a distribution of color for each block of the image or a distribution of intensity for each block of the image. Data describing a distribution may be compressed or otherwise approximated for savings in storage and processing time. Such processed data is known as a histogram. A histogram may be further transformed into a signature by extracting significant information from the histogram. The term "set of distributions" used herein may refer to original distributions of an image, histograms of an image, signatures of an image, or any other set of data characterizing blocks or segments of the image.

The weight calculator 110 is responsible for calculating weights for blocks or segments of the image. A weight may indicate the importance of each block or segment with respect to other blocks or segments in view of a relevant image characteristic. For example, for a color histogram of a block, a weight may specify which part of the color pixels of the image is contained in this block.

The image comparator 102 is responsible for receiving distribution sets pertaining to two images and associated weights from the image data preprocessor 104 and determining how similar the two images are based on the received information. In one embodiment, the image comparator 102 includes an earth mover's distance (EMD) module 124 and a similarity identifier 126. The EMD module 124 is responsible for calculating the EMD for the two images. As will be discussed in greater detail below, the EMD module 124 computes a series of Hausdorff distances, and reports the EMD as the weighted sum of the computed Hausdorff distances.

The similarity identifier 126 uses the EMD to determine how similar the two images are. In one embodiment, the similarity identifier 126 identifies the most different blocks or segments in the two images using the first computed Hausdorff distance in the series. The similarity identifier 126 may also identify blocks or segments of intermediate similarity based on Hausdorff distances that are weighted and summed, but do not include all Hausdorff distances up to the last one computed. In one embodiment, the similarity identifier 126 controls the number of computed Hausdorff distances by limiting the number of operations performed by the EMD module for the two images.

As discussed above, the EMD is the sum of the amount of dirt moved between pairs of holes multiplied by the distance between the holes. When the hole or dirt that is least is eliminated, the size of this hole or dirt multiplied by the distance it was moved is added to a running sum. Traditional EMD methods always continue until there are no more piles of dirt, and the distance order and how it is calculated depend only on a linear programming rule, not the geometry of the problem. In embodiments of the present invention, when enough distances are calculated, weighted by the dirt and summed, the result is used as the similarity distance.

FIGS. 2-4 and 6 illustrate processes performed by the image comparator 120 according to some embodiments of the present invention. The processes may be performed by processing logic that may comprise hardware (e.g., circuitry, dedicated logic, etc.), software (such as run on a general purpose computer system or a dedicated machine), or a combination of both. For a software-implemented process, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be appreciated that more or fewer operations may be incorporated into the processes illustrated in FIGS. 2-4 and 6 without departing from the scope of the invention and that no particular order is implied by the arrangement of blocks shown and described herein.

Figure 2:
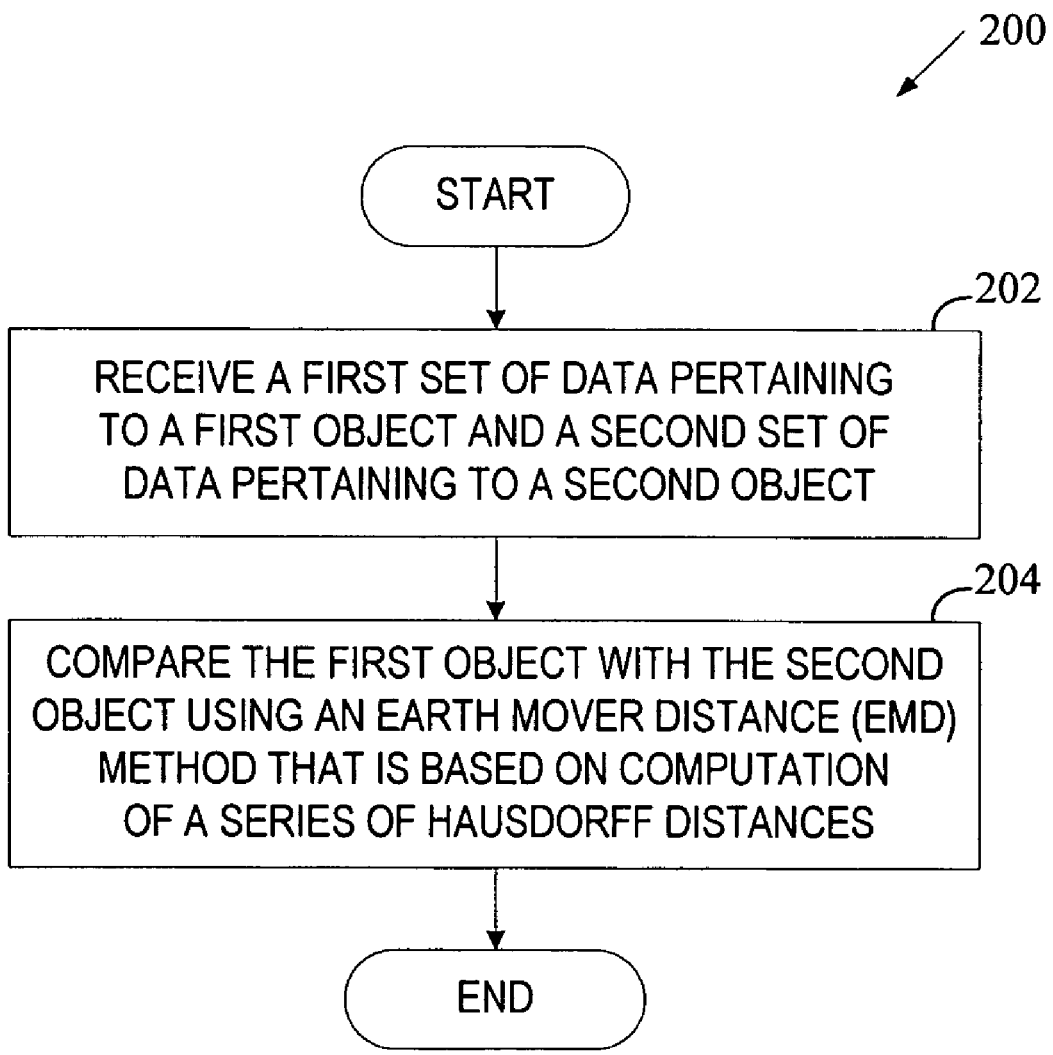
FIG. 2 is flow diagram of one embodiment of a data comparison process.

FIG. 2 is flow diagram of one embodiment of a data comparison process 200.

Referring to FIG. 2, process 200 begins with processing logic receiving a first set of data pertaining to a first object and a second set of data pertaining to a second object (processing block 202). For example, the first and second objects may be two images, and the first and second sets of data may be sets of distributions for the two images. In another example, the first object may represent a statistical model (e.g., a statistical model constructed to predict results of the next presidential election), the second object may represent a real-life event (e.g., actual presidential election), and the first and second sets of data may represent sets of information characterizing the statistical model and real-life event respectively. In yet another example, the first and second objects may represent two pieces of music, and the first and second sets of data may represent sets of audio spectrum distributions for the two pieces of music.

At processing block 204, processing logic compares the first object with the second object using an EMD method that utilizes a series of Hausdorff distances, as will be discussed in more detail below. In one embodiment, processing logic uses the EMD computed by the EMD method to determine how similar the two objects are. In one embodiment, processing logic may identify the most different portions in the two objects using the first computed Hausdorff distance in the series. In addition, processing logic may identify portions of intermediate similarity in the two objects based on Hausdorff distances computed in the middle.

Embodiments of the EMD method will now be discussed in more detail. A conventional EMD method computes the EMD by solving a linear program called the Transportation Problem that uses the following expression:

$$\min z = \sum_{i,j} l_{ij} f_{ij}$$

$$\sum_j f_{ij} = s_i$$

$$\sum_i f_{ij} = d_j$$

$$f_{ij} \geq 0$$

where $f_{ij}$ is the flow from source $s_i$ to destination $d_j$, and $l_{ij}$ is the cost of moving from $s_i$ to $d_j$.

This problem is solved by solving the following dual problem:

$$\max w = \sum_i s_i p_i + \sum_j d_j q_j$$

$$p_i + q_i \leq l_{ij}$$

where $p_i$ and $q_j$ represent the constraints at the source and destination, respectively.

This problem can be solved by the Simplex method. In the Simplex tableau, any entering and leaving variables can be chosen, subject to certain restrictions. For example, the method can start at a basic feasible solution, then an entering variable that has a negative reduced cost can be selected. Next, the blocking variable can be chosen by the least ratio between the right hand side (RHS) value and the pivot element. The method stops when there are no candidates for entering variable (or if the solution becomes unbounded or infeasible).

The above probabilistic solution can be approached from a geometric point of view. In particular, the source values (the costs or reduced costs in the $p_i$ columns) can be characterized as piles of dirt, and the destination values (the costs or reduced costs in the $q_j$ columns) can be characterized as capacities of holes. On each pivot, dirt can be moved from a pile to a hole, with the two new reduced costs reflecting the amount of dirt or hole capacity that is left behind. For this reason, the method ends with all the piles used up and all the holes filed. If each distribution in the set (or each data item in the data set) is considered to be a weighted point set (in a space whose dimensions are decided by the meaning of the clusters), then the pivoting method can pick the distance (the RHS value) which is the maximum over the distances from each $p_i$ to the set Q, and the distance which is the maximum over the distances from each $q_j$ to the set P, where the elements in each set are taken only from the points that represent remaining piles or holes. The blocking algorithm, which makes sure that the Simplex routine moves along extremes by picking the least ratio element for pivoting, always chooses the correct distance and hole or pile, since it picks the point-set distance. By construction, since the routine moves from set distance to set distance, and always exhausts one weighted point, the pivot selection method never cycles, and picks the optimal element once the last two points have been consumed. In short, if P and Q are two weighted point sets, in a space with underlying distance function d, then the EMD method can be presented as follows:

1. Calculate H(P, Q).
2. Find the elements $p_i$, $q_j$ such that $d(p_i, q_j)$=H(P,Q).
3. Reduce the weights on these elements by $f_{ij}$=min($w_i$,$u_j$) where $w_i$ is the weight for $p_i$ and $u_j$ is the weight for $q_j$. Remove the element(s) which have reached zero weight from the(ir) respective set(s). By abuse of notation, we continue to refer to the revised sets as P, Q. Add $f_{ij}$ to the list of flows ($\{f_{ij}\}$), and the calculated H(P, Q) to the list of distances ($\{d_{ij}\}$).
4. Repeat steps 1-4 until P, Q are exhausted. If they are of different cardinality and weight then only one will be exhausted.

Then, the sum of the flows and distances $\Sigma_{ij} f_{ij} d_{ij}$ is a composed sequence of Hausdorff distances and is the optimal objective function of the linear program associated with the EMD, and is the EMD for the two weighted sets (modulo a denominator if the sets differ in total weight). Note that in this interpretation, the Hausdorff distance and the EMD share the same underlying distance function. In fact, defining EMD(P, Q) by this use of H(P, Q) allows any underlying distance that suffices as a distance between points and sets.

The computation of the EMD as a series of Hausdorff distances allows for building of a large range of feature detectors at all levels. Hausdorff metric is usually thought of as an extension of a deterministic metric, used in deterministic (possibly chaotic) dynamical systems as a generalization of the $L^p$ metrics, among others. The EMD is usually thought of as one of a set of probabilistic measures used as distance functions or divergences of distributions. Hence, the computation of the EMD as a series of Hausdorff distances indicates a bridge between the two bodies of thought.

Further, one way to think of the Hausdorff metric is that it applies a nearest counterpart strategy to find correspondences between sets, and then applies a novelty filter to generate the distance between them. It is the most different element of the set of closest correspondences between sets. In this regard, the EMD linear program is essentially a series or cascade of novelty filters. In addition, the linear program can be reconstructed at each step, since the links between clusters are independent of each other. In other words, if the remaining cluster sets are modified at the end of each step, adding new rows and columns, they do not change the previously executed steps. This allows the linear program to be intertwined with a process of drawing analogies and adding resources in response to the steps applied. Implemented as a neural network or a recurrent neural network, this provides a powerful tool for creating descriptions as similar objects are recollected.

Figure 3:
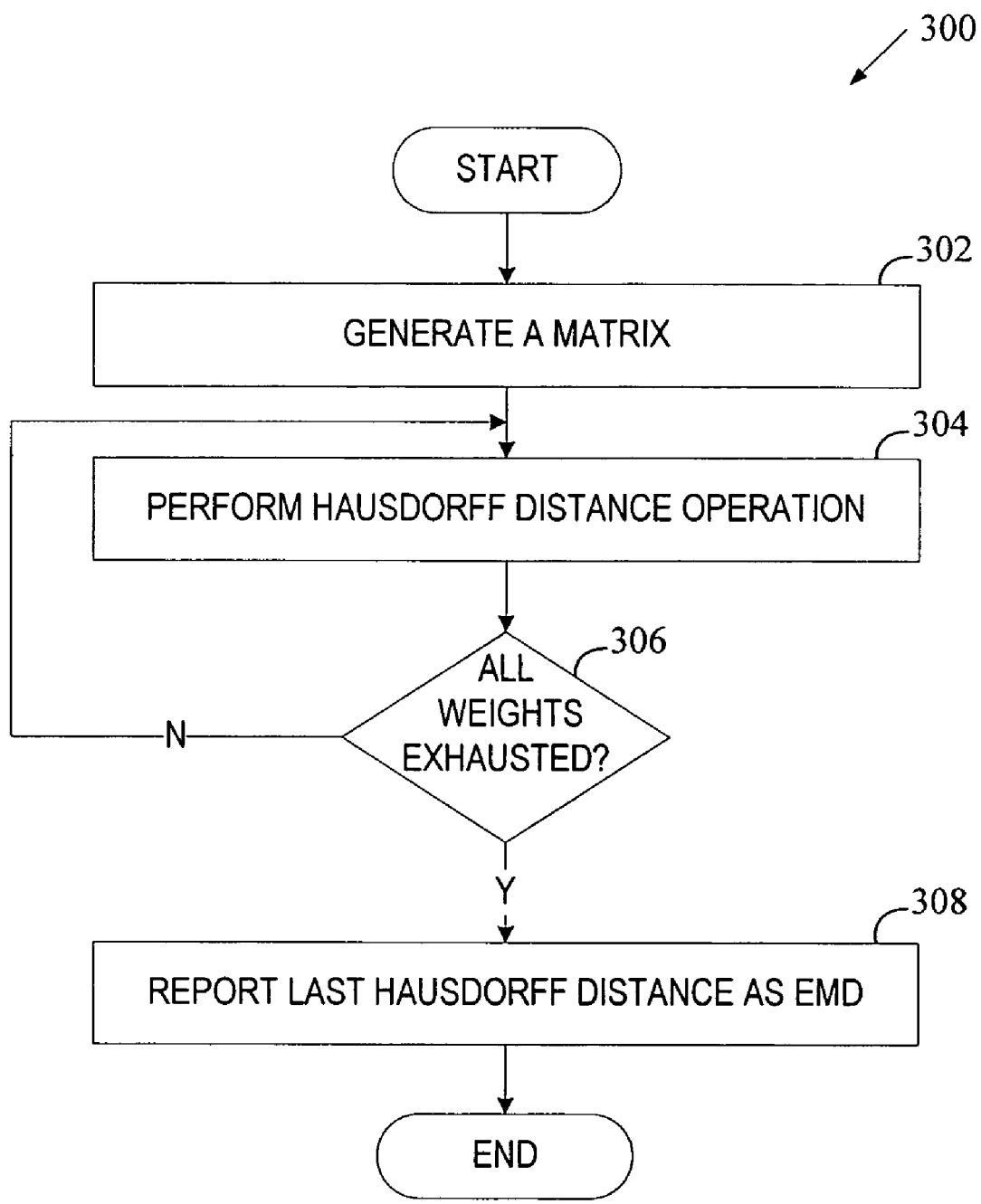
FIG. 3 is flow diagram of one embodiment of an EMD method.

FIG. 3 is flow diagram of one embodiment of an EMD method 300. The EMD method 300 operates by computing a series of Hausdorff distances as discussed above.

Referring to FIG. 3, process 300 begins with processing logic generating a matrix according to an abbreviated version of the linear program. The matrix includes multiple element columns and an RHS column. The element columns represent distributions from a first distribution set pertaining to a first image and distributions from a second distribution set pertaining to a second image. The RHS column represents distances between distributions. These distances may be, for example, Euclidean distances or any other distances calculated using one of various distance measurement techniques. The matrix also includes element rows that are populated for all possible distribution pairs from the two sets. The bottom row of the matrix stores weights associated with the distributions in corresponding columns.

FIG. 5 illustrates an exemplary matrix 500 that includes columns 502 representing distributions x1 and s2 pertaining to a first image and distributions y1, y2 and y3 pertaining to a second image. RHS column 504 stores, in each row, a distance between two distributions identified by a linear program coefficient of 1 (e.g., element 506) in the row. Rows 508 of the matrix are populated for all combinations of x1 with distributions from the second set, as well as combinations of x2 with distributions from the second set. The bottom row 508 stores weights for distributions x1, x2, y1, y2 and y3.

Returning to FIG. 3, at processing block 304, processing logic performs a Hausdorff distance operation that computes a Hausdorff distance, as will be discussed in more detail below. Processing logic performs block 304 several times until all weights are exhausted (processing block 306), and then reports the Hausdorff distance computed during the last Hausdorff distance operation as the EMD (processing block 308).

Figure 4:
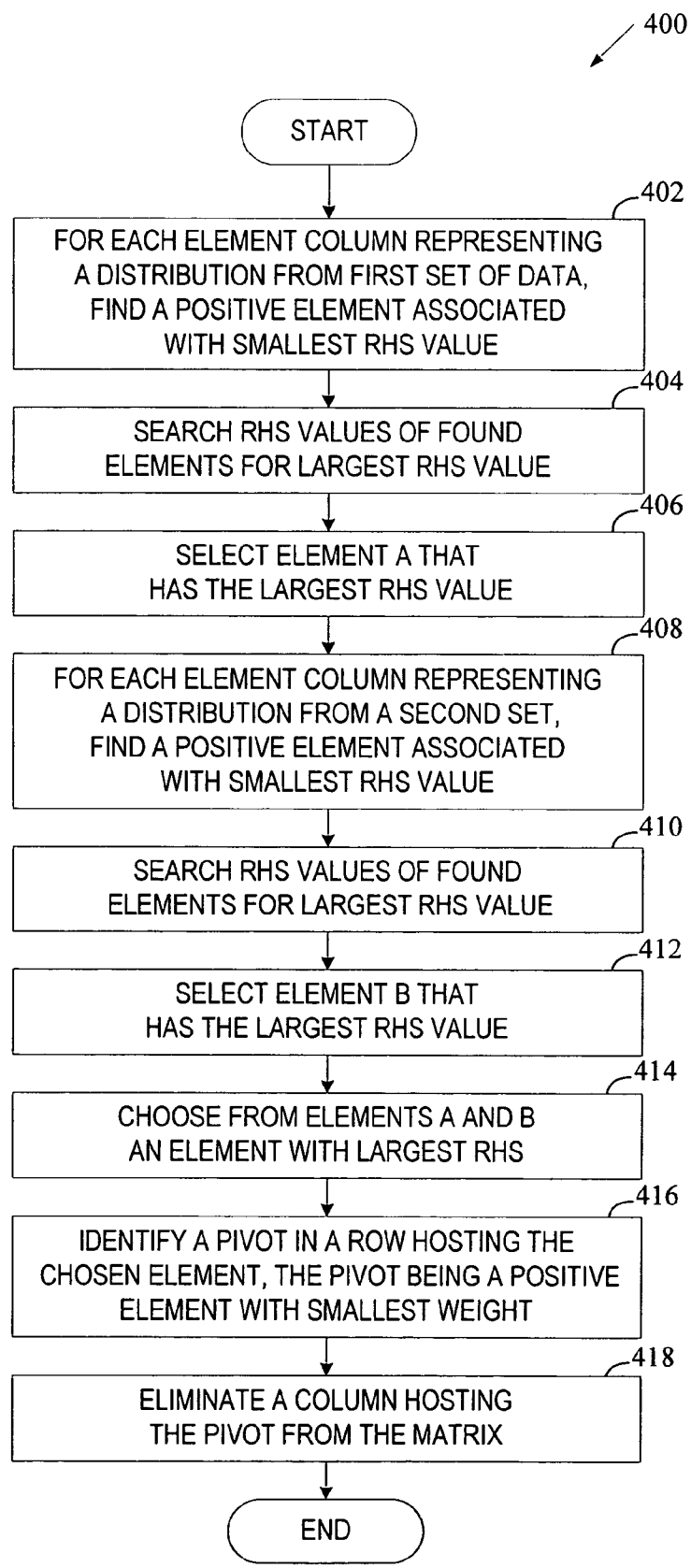
FIG. 4 is a flow diagram of one embodiment of a process for computing a Hausdorff distance as part of the EMD method.

FIG. 4 is a flow diagram of one embodiment of a process for computing a Hausdorff distance as part of the EMD method.

Referring to FIG. 4, processing logic first finds, for each element column representing a distribution from the first set, a positive (greater than 0) element having the smallest RHS value (processing block 402), then searches RHS values of the found elements for the largest RHS value (processing block 404), and selects the element with the largest RHS value (element A) (processing block 406). This RHS value is the maximum over the distances from each distribution of the first set to the second set.

Next, processing logic finds, for each element column representing a distribution from the second set, a positive element having the smallest RHS value (processing block 408), searches RHS values of the found elements for the largest RHS value (processing block 410), and selects the element with the largest RHS value (element B) (processing block 412). This RHS value is the maximum over the distances from each distribution of the second set to the first set.

At processing block 414, processing logic chooses, from elements A and B, the element that has the largest RHS. At processing block 416, processing logic identifies a pivot in a row hosting the element chosen at processing block 414. The pivot is a positive element with the smallest weight in this row. The Hausdorff distance between the first distribution set and the second distribution set is then equal to the RHS value of the pivot element multiplied by the weight of the pivot element. The row hosting the pivot element identifies two distributions whose degree of similarity can be measured by this Hausdorff distance.

At processing block 418, processing logic eliminates a column hosting the pivot from the matrix.

In the matrix illustrated in FIG. 5, the pivot is element 512, and the Hausdorff distance is equal to RHS 510 multiplied by weight 514. According to method 400, the column y2 that hosts the pivot 504 is eliminated from the matrix 500. The next Hausdorff distance operation will be performed based on the matrix containing columns x1, x2, y1 and y3.

The above described EMD method may be optimized to provide for minimum searching and higher efficiency. In particular, because the EMD can be computed as a series of Hausdorff distances, there are special properties to the linear program that is used to do the computation, which make this computation more efficient than an arbitrary linear program. Specifically, there are a number of facts concerning the linear program for the Hausdorff distance calculation. These facts are based on a combination of the set up of the linear program, and the underlying model, that of choosing a particular pair of distribution or point elements, and eliminating the smaller of the two. Assuming first that the weights given are as in the EMD, and refraining from considering any other weighting scheme until after generating the final form, the first proposition is that no column is host to a pivot twice. The proof for this is that the reduced cost of the column is reduced to zero, and the column becomes ineligible to host a pivot.

The second proposition is that no row is host to a pivot twice. The proof for this is that the items in the row become dead links, since one endpoint of the distance vectors they represent has been eliminated. If the row were used again, it would indicate that a distance existed between one of the elements of the reduced problem and a signature element that was already eliminated.

The third proposition is that no internal row that is altered by a pivot is ever used as a pivot. The proof for this is that such a row also becomes a dead link. If not, there would be nothing to alter in it, since the pivot column would not have a non-zero element in that row.

The fourth proposition is that each row that is eligible to be a pivot has two non-zero entries among the variables, and one element among the slack variables. The proof for this is that, because each row represents a single link, this is its initial condition. Since the row will not be used for a pivot if there are alterations, it will be in this state if it is a pivot row.

The fifth proposition is that the linear program for the EMD in the form of a series of Hausdorff distances (or for that matter, in general) can always be put into the matrix form described above in conjunction with FIGS. 4 and 5. The proof for this is that the form is put together by starting with the distribution element x1, and listing its distances to the elements of the distribution set Y. Then, similar operation is performed for the element x2, and so forth.

The sixth proposition is that on completion of a single pivoting operation, the rows and columns that have contributed to this operation may be eliminated from the linear program. There are two ways to approach this proposition. The affected rows and columns are those that contain information about links to the node that is being eliminated. Consequently, in the geometrical version of the problem, eliminating these rows and columns merely reduces the problem to the new problem of two distributions that have been adjusted to the elimination of this node. Since this can be set up as an entirely new linear program, which will not contain these rows and columns, eliminating them does not affect the outcome of the problem. Looking in terms of the linear program, the above propositions essentially say that no new pivoting operations will use these rows and columns. Since the rest of the linear program is solved without using these rows and columns, they may be eliminated.

Accordingly, the EMD method can be applied by folding the linear program into an augmented matrix with the rows labeled with distributions from the first set and the columns labeled with distributions from the second set. The entries in the matrix may be the distances between the corresponding row and column elements. The matrix may be augmented in the row and column direction with the weights of the elements for which the row or column is labeled. The proof for this is that, because we eliminate the row and column of the pivot element, there is no information in the row that will be used again, including the weight. In fact, for the eliminated weight element, there are no matrix entries in the proposed format (row or column depending on which has lower weight) that will be used again, and in the linear program this constitutes the column. The rejection of the information stored in the row, and in the columns it crosses, must be allowed, since after the elimination of the element and its distances, and the adjustment of the element it is affecting, the new problem must be as if we started with one reduced weight, and no eliminated element. Consequently, all the recorded information that is being discarded by this format is unnecessary to the decision on the next pivot point, and therefore to the problem.

Figure 6:
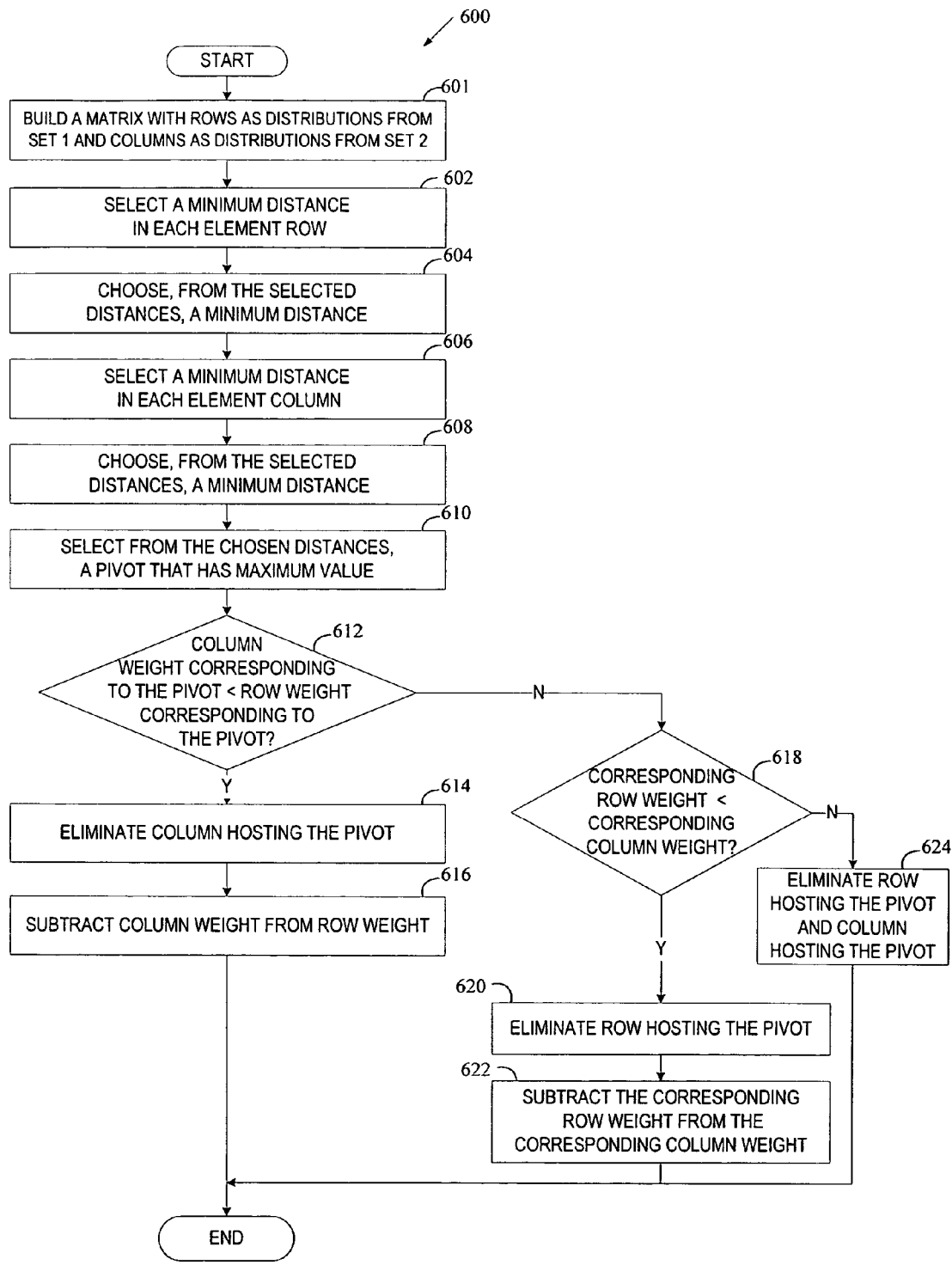
FIG. 6 is flow diagram of an alternative embodiment of an EMD method.

In view of the above, one embodiment of the EMD method can include operations illustrated in FIG. 6.

Referring to FIG. 6, method 600 begins with processing logic building the matrix with element columns representing distributions from the first set and element rows representing distributions from the second set, augmenting the matrix with the weights of the elements in both row and column, and populating the entries in the matrix as distances between the corresponding row and column elements (processing block 601).

Next, processing logic selects a minimum distance in each element row (processing block 602), chooses the smallest one from the distances selected from the element rows (processing block 604), selects a minimum distance in each element column (processing block 606), chooses the smallest one from the distances selected from the element columns (processing block 608), and selects from the two distances a pivot that has the maximum value.

Then, processing logic compares the weight associated with the column hosting the pivot with the weight associated with the row hosting the pivot. If the weight from the column hosting the pivot is less than the weight from the row hosting the pivot (processing block 612), processing logic eliminates the column hosting the pivot from the matrix (processing block 614) and subtracts the weight of the eliminated column from the weight of the row hosting the pivot (processing block 616).

Otherwise, if the weight in the row hosting the pivot is less than the weight in the column hosting the pivot (processing block 618), processing logic eliminates the row hosting the pivot from the matrix (processing block 620) and subtracts the weight of the eliminated row from the weight of the column hosting the pivot (processing block 622).

Alternatively, if the weight in the column hosting the pivot is equal to the weight in the row hosting the pivot, processing logic eliminates both the column and the row hosting the pivot from the matrix (processing block 624).

The Hausdorff distance is equal to the pivot's value multiplied by the smaller weight.

Once, the row and/or the column hosting the pivot is eliminated, processing logic determines whether more than one row and column remains in the matrix. If so, processing blocks 602 through 624 are repeated. The Hausdorff distance computed in the last iteration is the EMD between the first set and the second set.

Figure 7:
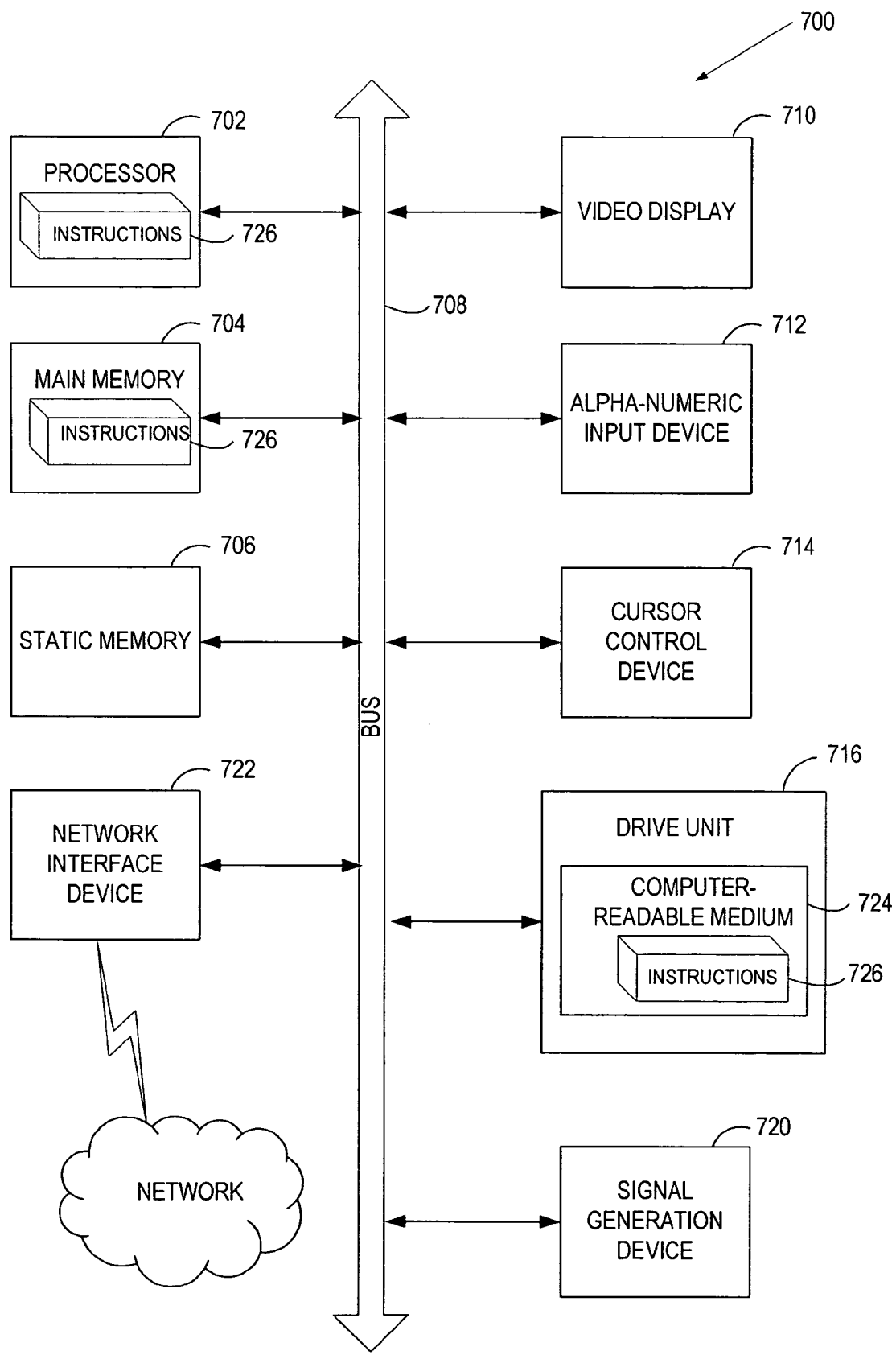
FIG. 7 is a block diagram of an exemplary computer system.

FIG. 7 shows a diagrammatic representation of machine in the exemplary form of a computer system 700 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g. a keyboard), a cursor control device 714 (e.g. a mouse), a disk drive unit 77, a signal generation device 720 (e.g., a speaker) and a network interface device 722.

The disk drive unit 716 includes a computer-readable medium 724 on which is stored a set of instructions (i.e., software) 726 embodying any one, or all, of the methodologies described above. The software 726 is also shown to reside, completely or at least partially, within the main memory 704 and/or within the processor 702. The software 726 may further be transmitted or received via the network interface device 722. For the purposes of this specification, the term "computer-readable medium" shall be taken to include any medium that is capable of storing or encoding a sequence of instructions for execution by the machine and that cause the machine to perform any one of the methodologies of the present invention. The term "computer-readable medium" shall accordingly be taken to included, but not be limited to, solid-state memories, optical and magnetic disks, and carrier wave signals.

Method and apparatus for comparing data sets has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is manifestly intended that this invention be limited only by the following claims and equivalents thereof.

What is claimed is:

1. A computerized method comprising:
   using a computer to carry out the method of receiving a first set of data pertaining to a first object and a second set of data pertaining to a second object; and
   comparing the first object with the second object using an earth mover's distance (EMD) method that is based on computation of a series of Hausdorff distances, the EMD method comprising generating a matrix having a plurality of element columns represented by the first and second sets of data, wherein the matrix includes a bottom weight row to store weights associated with the first and second sets of data, and a right hand side (RHS) column to store distances between corresponding items from the first and second sets of data and wherein a Haussdorf distance operation is performed once to identify two most different elements in the first and second sets of data.

2. The computerized method of claim 1 wherein the first object is a first image and the second object is a second image.

3. The computerized method of claim 1 wherein the EMD method further comprises calculating a series of Hausdorff distance by performing a Hausdorff distance operation N number of times until exhausting all the weights, the weighted sum of the series of Hausdorff distances representing an EMD between the first set of data and the second set of data.

4. The computerized method of claim 1 wherein the Hausdorff distance operation is performed L number of times to identify elements in the first and second sets of data that are less different than the most different elements in the first and second sets of data and more different than the most similar elements in the first and second sets of data, L being smaller than N.

5. The computerized method of claim 3 wherein the Hausdorff distance operation comprises:
   for each of the plurality of element columns representing the first set of data, finding a positive element associated with a smallest RHS value;
   searching RHS values of found elements associated with the first set of data for a largest RHS values;
   selecting a first element in one of the plurality of columns representing the first set of data that has the largest RHS value;
   for each of the plurality of element columns representing the second set of data, finding a positive element associated with a smallest RHS value;
   searching RHS values of found elements associated with the second set of data for a largest RHS values;
   selecting a second element in one of the plurality of columns representing the second set of data that has the largest RHS value;
   choosing from the first and second element an element with a largest RHS;
   identifying a pivot in a row hosting the chosen element, the pivot being a positive element with a smallest weight; and
   if the first matrix has two or more element columns, eliminating a column hosting the pivot from the first matrix.

6. The computerized method of claim 1 wherein the EMD method comprises:
   generating a matrix having a plurality of element rows represented by the first set of data and a plurality of element columns represented by the second sets of data; and
   storing distances between pairs of elements from the first and second sets of data as corresponding entries of the matrix.

7. The computerized method of claim 6 wherein the matrix includes a bottom weight row to store weights associated with the first set of data, and a right hand side (RHS) weight column to store weights associated with the first set of data distances between corresponding items from the first and second sets of data.

8. The computerized method of claim 7 wherein the EMD method further comprises calculating a series of Hausdorff distances by performing a Hausdorff distance operation N number of times until exhausting all the weights, the last of the series of Hausdorff distances representing an EMD between the first set of data and the second set of data.

9. The computerized method of claim 8 wherein the Hausdorff distance operation comprises:
selecting a minimum distance in each of the plurality of element rows;
choosing, from the selected row distances, a minimum row distance;
selecting a minimum distance in each of the plurality of element columns;
choosing, from the selected column distances, a minimum column distance;
selecting. from the chosen row and column distances, a pivot that has a maximum value;
if a column weight corresponding to the pivot is smaller than a row weight corresponding to the pivot, eliminating a column hosting the pivot, and subtracting the corresponding column weight from the corresponding row weight;
if the corresponding row weight is smaller than the corresponding column weight, eliminating a row hosting the pivot, and subtracting the corresponding row weight from the corresponding column weight; and
if the corresponding row weight is equal to the corresponding column weight, eliminating the row hosting the pivot and the column hosting the pivot.

10. A computer readable medium that provides instructions, which when executed on a processor cause the processor to perform a method comprising:
receiving a first set of data pertaining to a first object and a second set of data pertaining to a second object; and
comparing the first object with the second object using an earth mover's distance (EMD) method that is based on computation of a series of Hausdorff distances, the EMD method comprising generating a matrix having a plurality of element columns represented by the first and second sets of data, wherein the matrix includes a bottom weight row to store weights associated with the first and second sets of data, and a right hand side (RHS) column to store distances between corresponding items from the first and second sets of data and wherein a Haussdorf distance operation is performed once to identify two most different elements in the first and second sets of data.

11. The medium of claim 10 wherein the first object is a first image and the second object is a second image.

12. The medium of claim 10 wherein the EMD method further comprises calculating a series of Hausdorff distance by performing a Hausdorff distance operation N number of times until exhausting all the weights, the weighted sum of the series of Hausdorff distances representing an EMD between the first set of data and the second set of data.

13. The medium of claim 10 wherein the Hausdorff distance operation is performed L number of times to identify elements in the first and second sets of data that are less different than the most different elements in the first and second sets of data and more different than the most similar elements in the first and second sets of data, L being smaller than N.

14. A system comprising:
a processor;
a memory coupled to the processor through a bus;
an earth mover's distance (EMD) module including instructions stored in the memory which when executed by the processor cause the processor to receive a first set of data pertaining to a first object and a second set of data pertaining to a second object; and
a similarity identifier to compare the first object with the second object using an EMD method that is based on computation of a series of Hausdorff distances, the EMD method comprising generating a matrix having a plurality of element columns represented by the first and second sets of data, wherein the matrix includes a bottom weight row to store weights associated with the first and second sets of data, and a right hand side (RHS) column to store distances between corresponding items from the first and second sets of data and wherein a Haussdorf distance operation is performed once to identify two most different elements in the first and second sets of data.

15. The system of claim 14 wherein the first object is a first image and the second object is a second image.

16. The system of claim 14 wherein the EMD module is further to calculate a series of Hausdorff distance by performing a Hausdorff distance operation N number of times until exhausting all the weights, the weighted sum of the series of Hausdorff distances representing an EMD between the first set of data and the second set of data.

17. The system of claim 16 wherein the EMD module is further to perform the Hausdorff distance operation L number of times to identify elements in the first and second sets of data that are less different than the most different elements in the first and second sets of data and more different than the most similar elements in the first and second sets of data, L being smaller than N.

18. The system of claim 16 wherein the EMD module is to perform the Hausdorff distance operation by
finding, for each of the plurality of element columns representing the first set of data, a positive element associated with a smallest RHS value,
searching RHS values of found elements associated with the first set of data for a largest RHS values,
selecting a first element in one of the plurality of columns representing the first set of data that has the largest RHS value,
for each of the plurality of element columns representing the second set of data, finding a positive element associated with a smallest RHS value,
searching RHS values of found elements associated with the second set of data for a largest RHS values,
selecting a second element in one of the plurality of columns representing the second set of data that has the largest RHS value,
choosing from the first and second element an element with a largest RHS,
identifying a pivot in a row hosting the chosen element, the pivot being a positive element with a smallest weight, and
if the first matrix has two or more element columns, eliminating a column hosting the pivot from the first matrix.

19. An apparatus comprising:
means for receiving a first set of data pertaining to a first object and a second set of data pertaining to a second object; and means for comparing the first object with the second object using an earth mover's distance (EMD) method that is based on computation of a series of Hausdorff distances, the EMD method comprising generating a matrix having a plurality of element columns represented by the first and second sets of data, wherein the matrix includes a bottom weight row to store weights associated with the first and second sets of data, and a right hand side (RHS) column to store distances between corresponding items from the first and second sets of data and wherein a Haussdorf distance operation is performed once to identify two most different elements in the first and second sets of data.

* * * * *